V. RETISKY.
FAUCET.
APPLICATION FILED MAY 6, 1909.

964,317.

Patented July 12, 1910.
2 SHEETS—SHEET 1.

WITNESSES
F. A. Hoster
Geo. J. Hostr

INVENTOR
Venceslav Retisky
BY
Munn Co.
ATTORNEYS.

V. RETISKY.
FAUCET.
APPLICATION FILED MAY 6, 1909.
964,317.
Patented July 12, 1910.
2 SHEETS—SHEET 2.
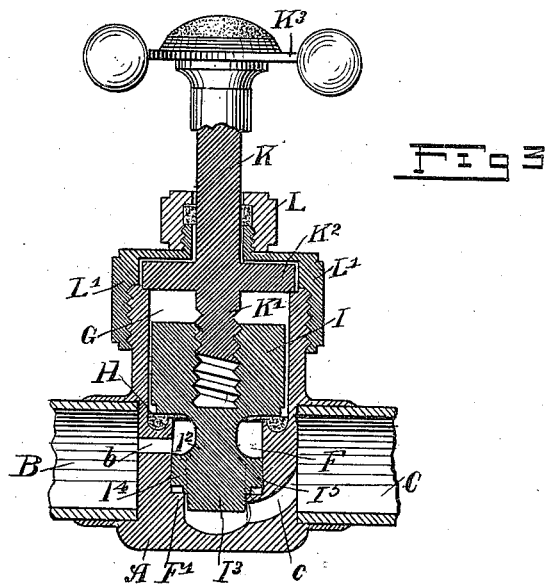
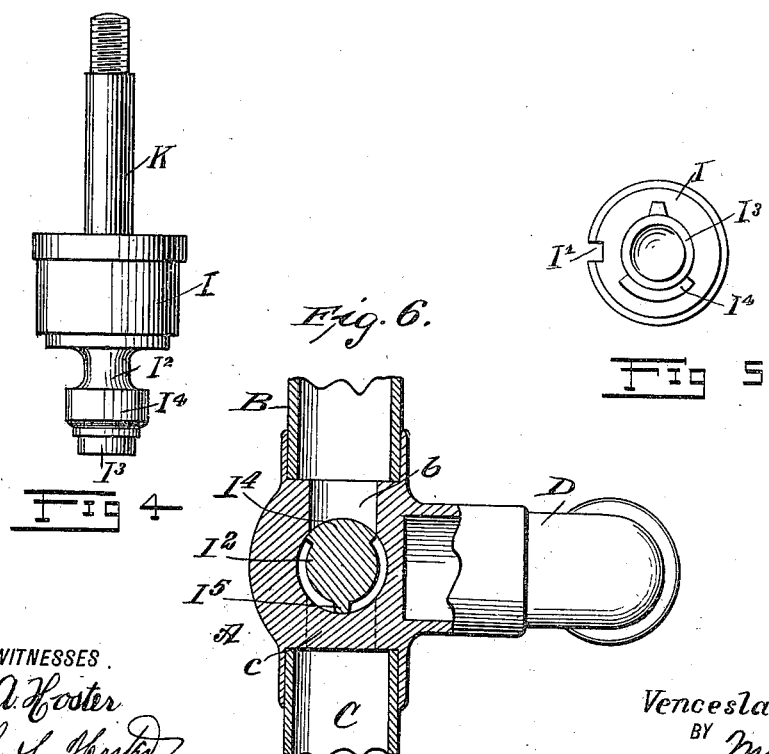
INVENTOR
Venceslav Retisky.

UNITED STATES PATENT OFFICE.

VENCESLAV RETISKY, OF NEW YORK, N. Y., ASSIGNOR OF ONE-HALF TO JOHN A. MURRAY, OF NEW YORK, N. Y.

FAUCET.

964,317. Specification of Letters Patent. Patented July 12, 1910.

Application filed May 6, 1909. Serial No. 494,219.

*To all whom it may concern:*

Be it known that I, VENCESLAV RETISKY, a citizen of the United States, and a resident of the city of New York, borough of the Bronx, in the county and State of New York, have invented a new and Improved Faucet, of which the following is a full, clear, and exact description.

The invention relates to water distribution, and its object is to provide a new and improved faucet, more especially designed for use on bath tubs, wash basins and similar articles, and arranged to permit of conveniently drawing hot and cold water separately, or the two together, to form lukewarm water of any desired degree of temperature.

In order to accomplish the desired result, use is made of a non-rotatable valve plug having an axial sliding movement relative to the hot and cold water supply ports and to the discharge port.

A practical embodiment of the invention is represented in the accompanying drawings, forming a part of this specification, in which similar characters of reference indicate corresponding parts in all the views.

Figure 1:
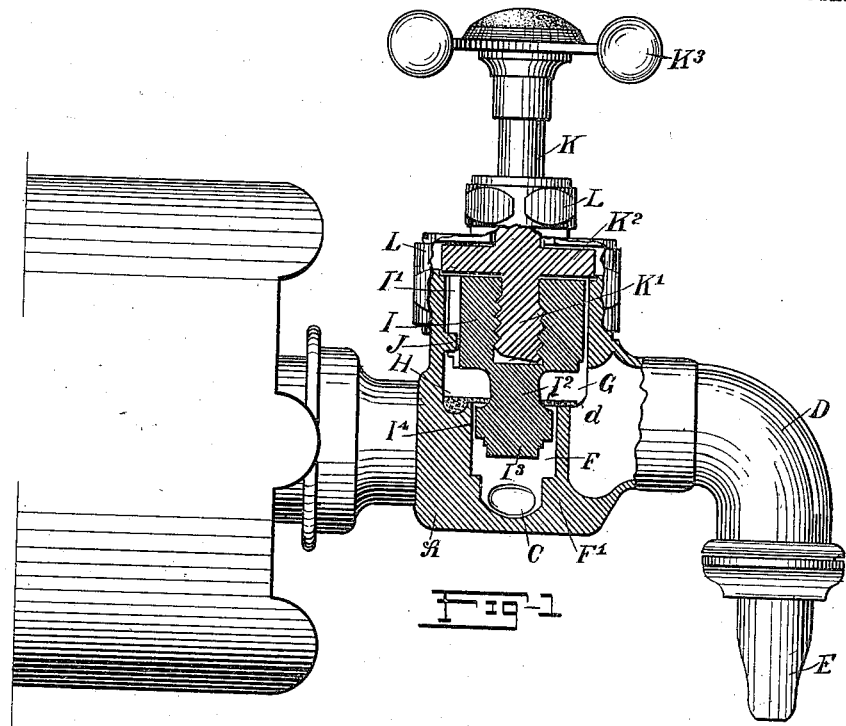
Figure 2:
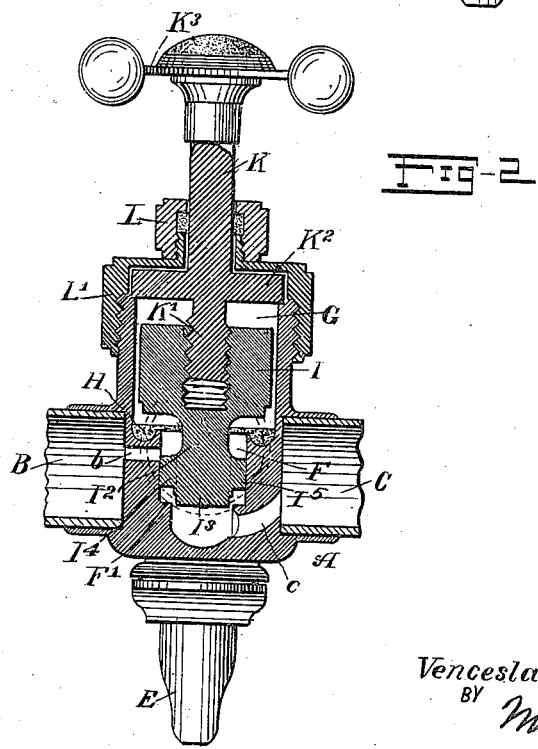

Figure 1 is a sectional side elevation of the improvement, showing the valve plug in position for drawing hot water only; Fig. 2 is a transverse section of the same, and showing the valve plug in position for drawing both hot and cold water to form lukewarm water; Fig. 3 is a similar view of the same, showing the valve plug in closed position; Fig. 4 is a side elevation of the valve plug; Fig. 5 is an inverted plan view of the same; and Fig. 6 is a sectional plan view of the device through the upper inlet port.

The valve body A of the faucet is provided at opposite sides with the cold water inlet pipe B and the hot water inlet pipe C, the pipes B and C being connected in the usual manner with the usual hot and cold water supplies. The body A is also provided at its front with an outlet pipe D, terminating in the usual spout E, and the valve body A is provided with bottom and top chambers F and G, of which the bottom chamber F is connected by the inlet ports $b$ and $c$ with the supply pipes B and C, and the upper chamber G is connected by an outlet port $d$ with the outlet pipe D. The chambers F and G form at their junction a valve seat H, on which is adapted to be seated the non-rotatable valve plug I, provided in one side with a vertically-extending groove I' engaged by a lug J formed on the valve body A, to hold the plug I against turning. An up and down movement is given to the valve plug I by the threaded portion K' of a valve stem K, screwing in the plug I, the stem K extending through a stuffing box L, held on a cap L', screwing on the upper end of the body A, and between the cap L' and the upper end of the body A is arranged a collar $K^2$, forming part of the stem K, so as to hold the latter against up and down movement, to allow turning of the same by the use of a suitable hand wheel $K^3$, arranged on the upper outer end of the stem K. The valve plug I is provided with a depending integral reduced stem $I^2$, terminating at its bottom in a valve $I^3$, adapted to engage a valve seat F' formed in the bottom of the lower chamber F (see Fig. 3). On one side of the stem $I^2$ is formed a valve $I^4$, in alinement with the upper inlet $b$, so as to open and close the same on moving the valve plug I down or up, which moves the valve $I^4$ in a corresponding direction. On the stem $I^2$, opposite the valve $I^4$, is formed a projection $I^5$, the valve $I^4$ and the projection $I^5$, being in contact with the inner wall of the valve chamber. Now when the operator turns the hand wheel $K^3$ in one direction, the valve plug I is moved downward into a closed position, so that the valve $I^3$ is seated on the valve seat F' and the plug I is seated on the valve seat H, as indicated in Fig. 3.

When it is desired to draw cold water, the operator turns the hand wheel $K^3$ in the opposite direction, to move the valve plug I upward, so that the latter leaves the seat H and uncovers the port $d$, while the valve $I^3$ still remains in engagement with the seat F'. Now cold water from the supply pipe B can pass by way of the port $b$ into the chamber F, and by way of the valve seat H into the lower portion of the chamber G, and through the port $d$ into the outlet pipe D and its spout E. When it is desired to draw lukewarm water, the operator turns the hand wheel $K^3$ still farther in the same direction, so that the valve $I^3$ leaves the seat F', while the valve $I^4$ partly closes the port $b$ and hence hot water can now pass up into the chamber F, to mingle with the cold water coming through the port $b$, the mixture passing through the seat H into the chamber G, and from the latter, by way of the port $d$ to the outlet pipe D and its spout E. When it is desired to draw but hot water, the operator turns the hand wheel $K^3$ still farther, so as to raise the valve plug I to the uppermost position, and in doing so the valve $I^4$ completely closes the port $b$, thus shutting off the cold water and allowing the hot water only to pass up through the chambers F and G and into the outlet pipe D and its spout E.

From the foregoing it will be seen that by the arrangement described, the valve plug I can be readily raised or lowered without turning the same, so that the user is enabled to draw either cold water, lukewarm water or hot water as desired. It will further be noticed that the faucet is very simple and durable in construction and is composed of comparatively few parts, not liable to get out of order or to cause leakage.

Having thus described my invention, I claim as new and desire to secure by Letters Patent:

1. A faucet having a body provided with upper and lower inlet ports at opposite sides thereof for hot and cold water, the said body having a valve seat in its lower part, the lower inlet port being below the said valve seat, the body having a main valve seat above the upper inlet port, and an outlet port above the main valve seat, a non-rotatable valve plug mounted to slide up and down in the said body and adapted to be seated on the main valve seat, the said valve plug having a depending stem provided at its bottom with a valve adapted to be seated on the valve seat in the lower part of the body, the said stem having a valve projecting from one side thereof for controlling the upper inlet port.

2. A faucet having a body, provided with inlet and outlet chambers forming a main valve seat between them, the inlet chamber having a valve seat at the bottom leading to a lower inlet port, and an upper inlet port in the side wall of the said inlet chamber, and the said outlet chamber having an outlet port above the main valve seat, a non-rotatable valve plug mounted to slide up and down in the said outlet chamber and adapted to be seated on the said main seat, the valve plug having a reduced depending stem provided at the bottom with a valve adapted to be seated on the seat in the said inlet chamber, and the said stem having a valve controlling the said upper inlet port, and means for moving the said valve plug up and down.

3. A faucet having a body provided with an inlet chamber for hot and cold water, and an outlet chamber above the inlet chamber and forming a main valve seat between the chambers, the said inlet chamber having a valve seat in its bottom and a lower inlet port at one side of the inlet chamber below the said valve seat, the said chamber having an upper inlet port at the opposite side of the inlet chamber between the said valve seats, inlet pipes at opposite sides of said valve body and connected by said ports with the inlet chamber, an outlet pipe at the front of said body, the upper or outlet chamber having an outlet port leading from above the main valve seat and connecting said chamber with the outlet pipe, a valve plug mounted to slide up and down in the said outlet chamber, means for holding the plug against turning, the said plug being adapted to be seated on the said main valve seat, the valve plug having a reduced depending stem provided at the bottom with a valve adapted to be seated on the valve seat in the bottom of the inlet chamber, the said stem having a valve at one side thereof controlling the said upper inlet port, and means for moving the said valve plug up and down.

4. A faucet having a body provided with a lower or inlet chamber for hot and cold water and an upper or outlet chamber, the inlet chamber having upper and lower inlet ports, and a valve seat in its lower part, and the outlet chamber having an outlet port, the said chambers forming at their junction a main valve seat, a valve plug mounted to slide up and down in the said outlet chamber and adapted to be seated on the main valve seat, the said plug having a reduced member extending into the inlet chamber and provided at its end with a valve adapted to be seated on the valve seat in the lower part of the inlet chamber to control the lower inlet port, the said member having a valve formed on one side thereof for controlling the upper inlet port and a projection on the opposite side, and means for moving the said valve plug up and down.

In testimony whereof I have signed my name to this specification in the presence of two subscribing witnesses.

VENCESLAV RETISKY.

Witnesses:
THEO. G. HOSTER,
PHILIP D. ROLLHAUS.